United States Patent [19]
Gasparik

[11] Patent Number: 5,608,390
[45] Date of Patent: Mar. 4, 1997

[54] SYNCHRONOUS TELEMETRY CHANNEL

[75] Inventor: Frank Gasparik, Monument, Colo.

[73] Assignees: AT&T Global Information Solutions Company, Dayton, Ohio; Hyundai Electronics America, San Jose, Calif.; Symbios Logic Inc., Fort Collins, Colo.

[21] Appl. No.: 200,721

[22] Filed: Feb. 23, 1994

[51] Int. Cl.$^6$ .................................................. G08C 19/16
[52] U.S. Cl. ...................... 340/870.01; 340/870.02; 340/870.1; 178/18; 178/19; 455/206; 455/306; 375/350
[58] Field of Search .................. 341/22, 34; 364/174, 364/175; 178/18, 19, 20; 381/13, 6, 4; 345/179; 455/206, 306; 375/350, 376; 340/870.01, 870.02, 870.03, 870.1

[56] References Cited

U.S. PATENT DOCUMENTS

| | | | |
|---|---|---|---|
| 3,629,716 | 12/1971 | Dimon | 329/50 |
| 3,745,255 | 7/1973 | Fletcher et al. | 179/155 |
| 3,952,302 | 4/1976 | Mullins | 343/7.7 |
| 4,209,750 | 6/1980 | Freitas et al. | 455/63 |
| 4,310,805 | 1/1982 | Hackert et al. | 331/1 A |
| 4,337,660 | 7/1982 | Weiss | 73/600 |
| 4,733,404 | 3/1988 | Ostoich | 375/119 |
| 4,786,765 | 11/1988 | Yamanami et al. | 178/19 |
| 4,902,858 | 2/1990 | Yamanami et al. | 178/19 |
| 5,138,118 | 8/1992 | Russell | 178/19 |
| 5,140,699 | 8/1992 | Kozak | 455/84 |
| 5,369,227 | 11/1994 | Stone | 178/18 |
| 5,373,118 | 12/1994 | Watson | 178/19 |
| 5,414,226 | 5/1995 | Matsushima | 178/18 |
| 5,446,416 | 8/1995 | Lin et al. | 331/11 |
| 5,459,432 | 10/1995 | White et al. | 329/307 |

*Primary Examiner*—Jeffrey Hofsass
*Assistant Examiner*—Ashok Mannava
*Attorney, Agent, or Firm*—Wayne P. Bailey

[57] ABSTRACT

The invention concerns pen-based computers, wherein a pen, or stylus, is positioned on a display of the computer, and produces a signal which allows the computer to detect the position of the stylus. The stylus produces a second signal, which is used as a carrier for telemetry, to transmit data from the stylus to the computer.

3 Claims, 12 Drawing Sheets

SYNCHRONOUS TELEMETRY CHANNEL

The invention concerns telemetry between a stylus and a digitizing tablet. The stylus delivers status reports about its condition to the tablet.

BACKGROUND OF THE INVENTION

Position Detection

FIG. 1 is a highly simplified view of a digitizing tablet 3 and its associated stylus 6. The digitizing tablet can take the form of a transparent overlay on the display of a portable computer (not shown). The tablet-and-stylus combination provide input to the computer.

In the tablet, there are four current-to-voltage amplifiers (labeled I-to-V), one at each corner. The stylus 6, when activated, produces a signal 9, as indicated in FIG. 2. This signal induces currents I1–I4, which are detected by the I-to-V amplifiers.

The I-to-V amplifiers each produce a voltage (V) indicative of the size its respective current (I). Processing circuitry, not shown but known in the art, receives the voltage signals, and computes the position of the stylus signal 6.

The currents I1–I4 are induced because the stylus 6 acts as one plate of a capacitor. The digitizing tablet (which bears a resistive surface, or grid, of a material such as indium tin oxide) acts as the other plate. As FIG. 3 indicates, when negative charge is applied to the tip 2 of the stylus 6, a positive charge is induced on the surface of the tablet 6. Currents I1–I4 supply this positive charge.

Conversely, as in FIG. 4, a positive charge on the tip 2 of the stylus 6 induces a negative charge on the tablet. The currents I1–I4 supply this negative charge.

As FIG. 5 shows, each current can be viewed as following a direct path from the stylus to one corner of the tablet. The resistance of each path depends on the length of the path. The size of the current depends on the resistance. Thus, knowledge of the current allows one to infer the path length. A highly simplified example will illustrate.

Assume that the stylus in FIG. 5 represents a voltage source applied to the tablet. The paths have the relative lengths shown in FIG. 5, and also listed the following Table.

TABLE

| PATH | RELATIVE LENGTH | RELATIVE RESISTANCE | RELATIVE CURRENT | RELATIVE I-to-V VOLTAGE |
|---|---|---|---|---|
| AA | 0.66 | 0.66 | 1.52 | 1.52 |
| BB | 1.00 | 1.00 | 1.00 | 1.00 |
| CC | 0.93 | 0.93 | 1.08 | 1.08 |
| DD | 0.55 | 0.55 | 1.82 | 1.82 |

The resistance of the path depends on the length, so that the relative resistances are in proportion to the relative path lengths, as indicated in the Table.

Current equals voltage divided by resistance, V/R, so that the relative currents will be inversely proportional to the relative path lengths, as indicated in the Table.

The I-to-V amplifiers in FIG. 1 each produce a voltage which is proportional to its respective current. Thus, the outputs of the I-to-V amplifiers have the relative magnitudes indicated in the Table. The output signals can be used to compute position of the stylus, as stated above.

Telemetry

The stylus contains circuitry which monitors battery charge, and other characteristics, and informs the computer, via the digitizing tablet, of these characteristics. The information is transferred by modulating the signal produced by the stylus (indicated as "9" in FIG. 2). The signal becomes a modulated carrier, and the information transfer is called telemetry.

Problems

Problems arise in the telemetry because of the interaction of several factors. For example, when the position of the stylus is being detected, the carrier is occupied, and cannot be used for telemetry. Thus, since telemetry and position detection cannot occur simultaneously, they must alternate with each other.

If position detection should require longer time periods, then the telemetry periods must be correspondingly shortened. For example, if handwriting, which is written by the stylus on the digitizing tablet, is to be recognized by the computer, then stylus position must be monitored for a relatively long time, thereby reducing the time intervals available for telemetry.

Reduction of the telemetry time intervals means that a higher data rate in each interval must be used, in order to transmit the same amount of data. However, a higher data rate is probably not feasible, because the signal of the stylus is limited to a specific bandwidth. The bandwidth determines the maximum data rate.

Further, the bandwidth limit imposes a lower limit on the settling time of the signal, which is illustrated as TS in FIG. 6. The limit on settling time, in effect, extends the duration of each pulse, from the ideal of T in FIG. 6, to the TOTAL duration indicated.

The increased duration of each individual pulse decreases the total number of pulses which can be transmitted in a given time interval.

Therefore, the reduction in the time intervals allocated to telemetry, together with the limited bandwidth allowed the position signal 9, limits the amount of data which can be delivered. It is expected that, as time progresses, larger amounts of data will be transmitted by telemetry. The limits must be circumvented.

OBJECTS OF THE INVENTION

An object of the invention is to provide an improved telemetry system for a stylus which communicates with a digitizing tablet.

A further object of the invention is to provide a stylus, for a digitizing tablet, which has a channel dedicated exclusively to telemetry.

SUMMARY OF THE INVENTION

In one form of the invention, a stylus for a digitizing tablet transmits two signals. One signal is used for position detection, and the other signal is used for telemetry.

DETAILED DESCRIPTION OF THE INVENTION

Figure 7:
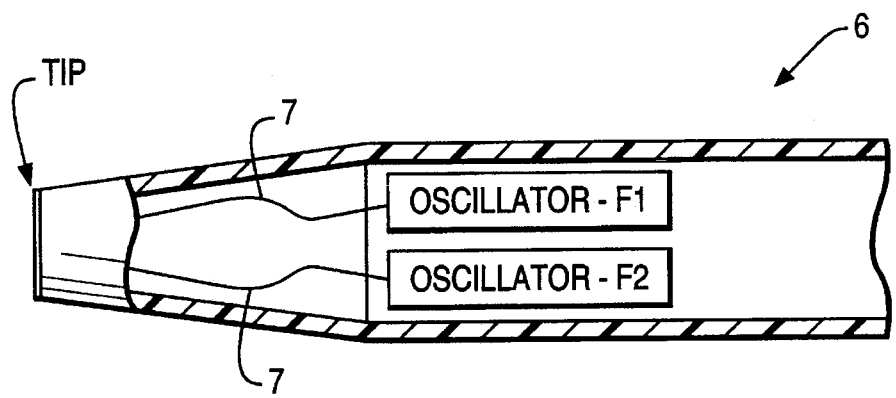
FIG. 7 illustrates a stylus containing two oscillators, which produce two signals at different frequencies.

FIG. 7 illustrates a stylus 6 containing two oscillators, which generate two different frequencies F1 and F2. The signals are delivered to the TIP by conductors 7. One frequency, F1, is 125 KHz, and is used as the position signal 9 in FIG. 2. The other frequency is used for telemetry, and runs at a specific multiple of F1, such as at 250 KHz, 500 KHz, or 750 KHz. A frequency of 250 KHz will be assumed at present.

Figure 8A:
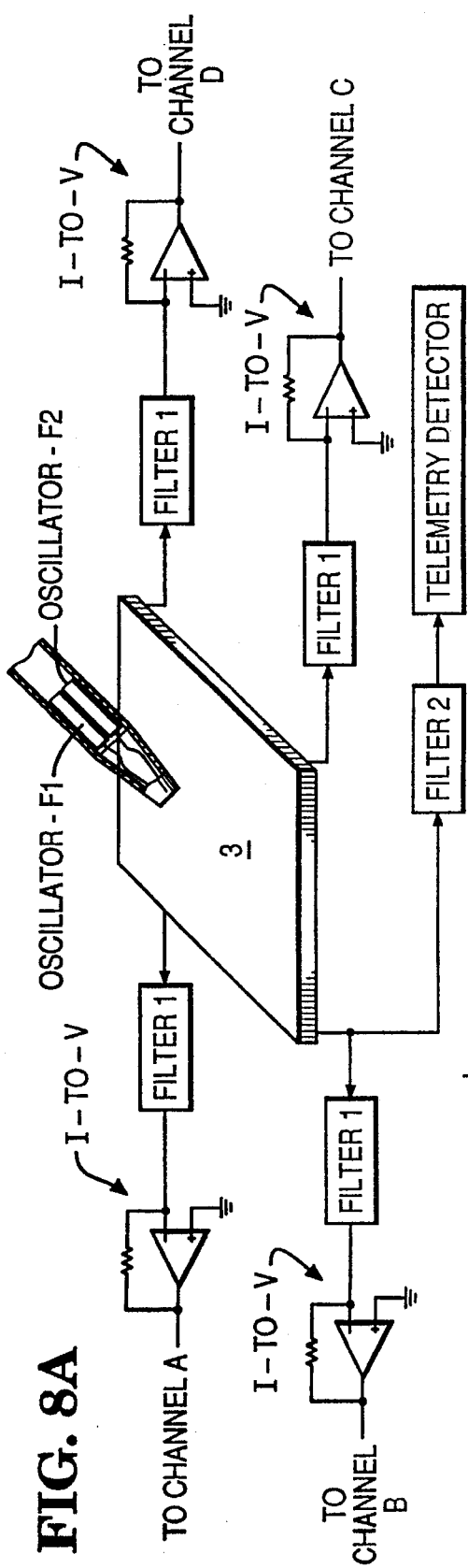
FIGS. 8A, 8B and 8C illustrate one form of the invention.

FIG. 8A shows the stylus, together wtih a digitizing tablet 3, which can take the form of a transparent overlay upon the display of a portable computer. Such tablets and computers are known in the art. The stylus transmits the two frequencies F1 and F2. (The two frequencies may be simultaneously transmitted, if telemetry and position are to be undertaken at the same time, but simultaneous transmission is not required.)

The tablet contains one or more receivers, known in the art, which receives the two carriers and feeds them to the FILTERs indicated in the Figure. FILTER_1 has the transfer characteristic shown, which is centered about 125 KHz. Each FILTER 1 (there are four such filters) passes the 125 KHz position signal to a respective I-to-V amplifier, which produces a signal which is fed to an analysis system (not shown). The analysis system computes the stylus position.

These FILTERs block the telemetry carrier. The telemetry carrier is passed by FILTER_2, which is centered about one of the zeroes of FILTER_1, as indicated. (Zeroes are more clearly indicated in FIG. 9A.), and are frequencies at which the amplitude of a signal passing through the filter is minimized with respect to signal amplitudes that are passed by the filter at frequencies slightly less than and slightly greater than the zero frequency.) In this example, FILTER_2 is centered about 250 KHz. FILTER_2 passes the telemetry signal of 250 KHz produced by the stylus, but blocks the 125 KHz position signal. Therefore, two signals, namely, a position signal and a telemetry signal, are transmitted simultaneously to the digitizing tablet. Circuitry internal to the tablet processes the position signal, and ascertains stylus position. Other circuitry processes the telemetry signal, which is actually a modulated carrier, and obtains information transmitted by the stylus.

Different Embodiment

In another embodiment, information can be also carried by the position signal (125 KHz in the example above). That is, the position signal would alternate between the tasks of providing position information and carrying information, as discussed in the Background. In addition, the telemetry carrier (250 KHz in the example above) would transmit information continually, or as often as desired. Thus, two signals carry telemetry data: the position signal, when not transmitting position information, and the telemetry carrier, when desired.

Important Considerations

Figure 8B:
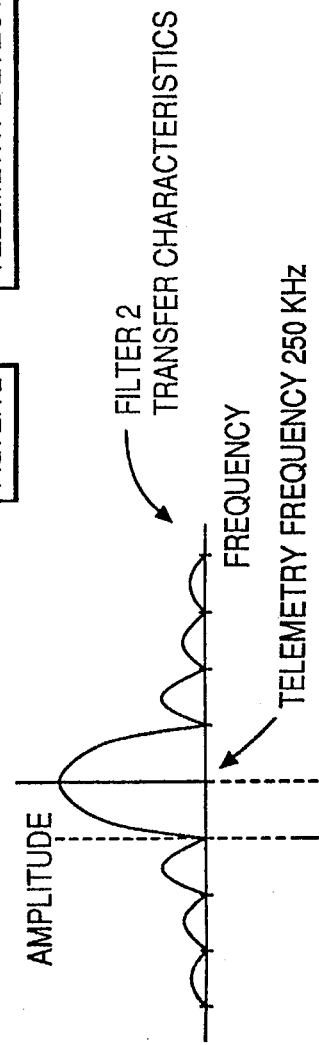
Figure 8C:
Figure 9A:
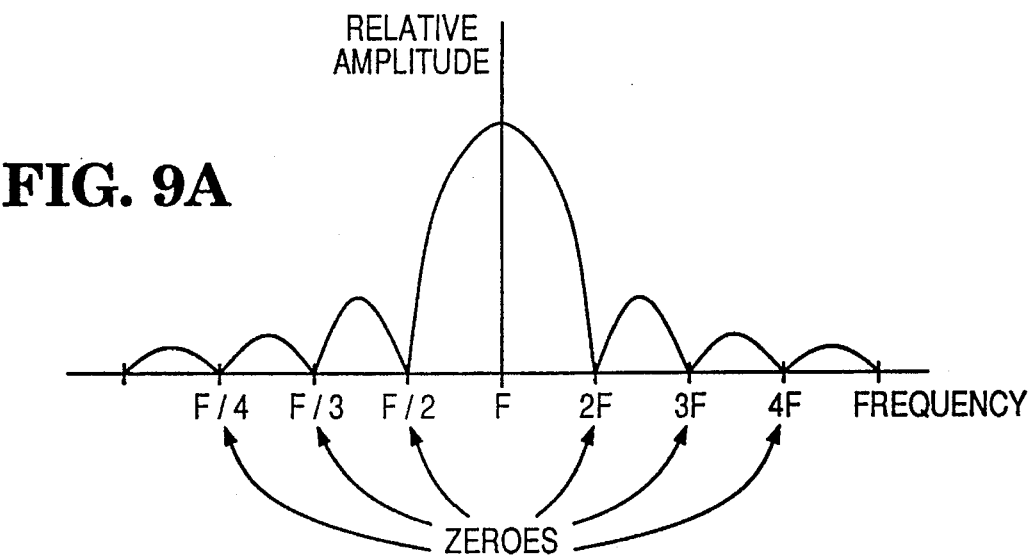
FIGS. 9A, 9B and 9C illustrate a generic transfer characteristic of the FILTERs, together with an enlarged view of the two transfer characteristics shown in FIGS. 8B and 8C.

1. The telemetry signal need not be centered at the particular zero shown in FIG. 8B, but can be located at any of them, such as F/4, F/3, F/2, 2F, 3F, or 4F, as shown in FIG. 9A. Some zeroes are located at integral multiples of the position signal, such as 2×125 KHz, 3×125 KHz, 4×125 KHz, and so on. Others are located at integral fractional multiples, such as ½×125 KHz, ⅓×125 KHz, ¼×125 KHz, or, more generally, 1/(n×125 KHz), and so on.

2. The filters shown in the examples have mutual, blocking zeroes. That is, in FIGS. 9B and 9C, zero Z10 of the telemetry-passing filter (FILTER 2) blocks the position signal, while zero Z9 of the position-passing filter (FILTER 1) blocks the telemetry signal.

Figure 10:
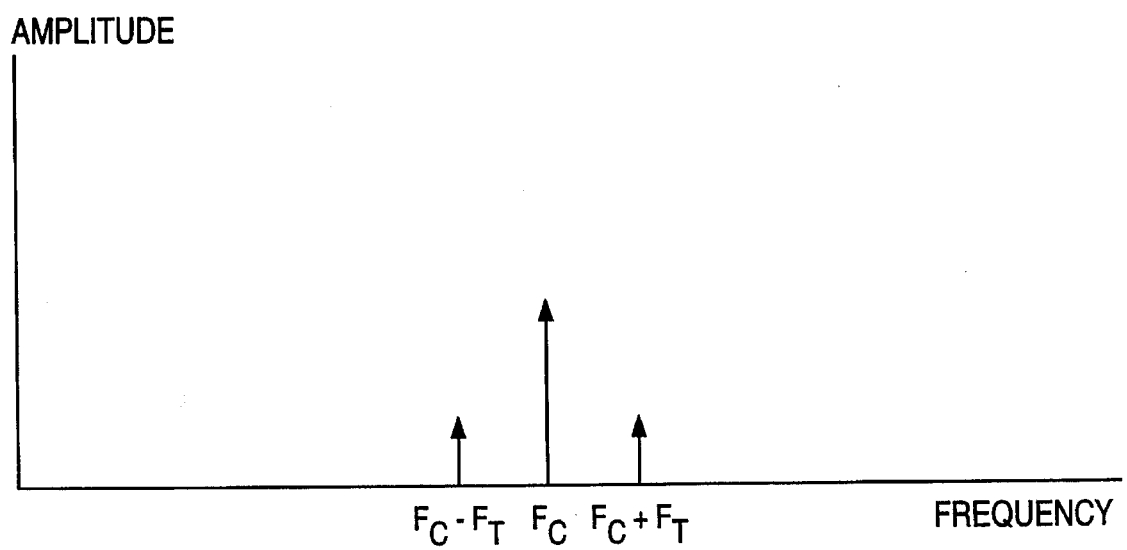
FIGS. 10 illustrates the two sidebands occurring when the telemetry frequency, fc, is amplitude-modulated by a tone at a frequency ft.

3. In general, modulation of the telemetry carrier increases its bandwidth. That is, as a simple example, if a carrier of frequency fc in FIG. 10 is modulated by a tone of frequency Ft, then the resulting signal spectrum is that shown. The resulting spectrum has a carrier C and two sidebands, one at fc+ft and the other at fc−ft. This roughly indicates how the bandwidth increases when the telemetry carrier, generated by the stylus, is modulated.

This increase in bandwidth is very small, if the modulation frequency is small. Thus, the overall signal spectrum is so close to the zero of FILTER_1, that the telemetry signal is effectively blocked, as indicated in FIG. 11.

Figure 9B:
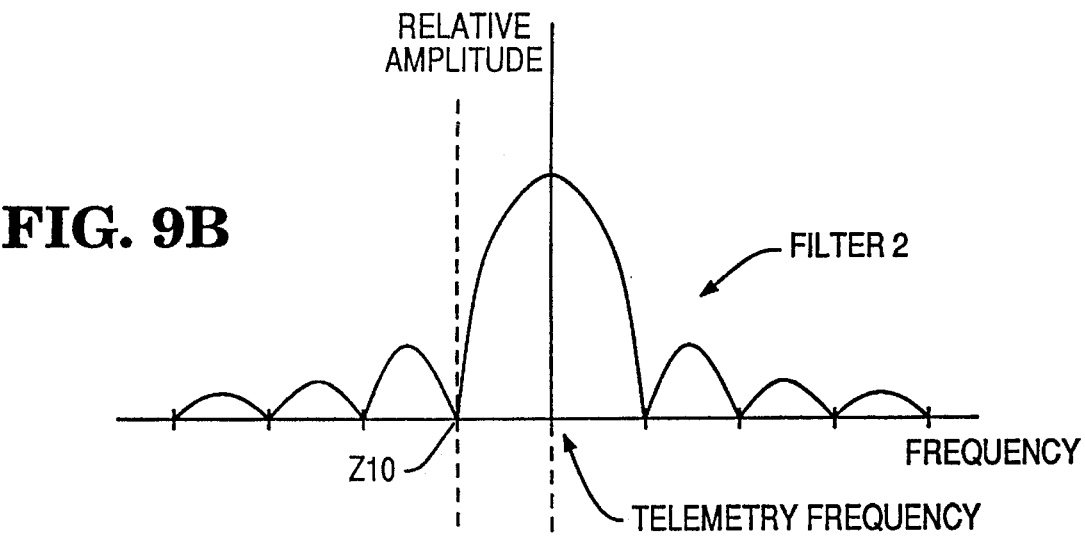

In actuality, the frequency spectrum occupied by the telemetry signal will be the simple, discrete triplet shown in FIG. 9B.

4. A telemetry data rate of 3900 bits per second can be attained, but, in practice, to conserve power in the battery-powered stylus, a data rate of about 500 bits per second is preferred.

5. The invention is not limited to the filters having the particular transfer characteristics described above. One inventive concept is to filter the telemetry carrier from the position signal. To do this, suitable combinations of bandpass, or notch filters, can be used.

Figure 12:
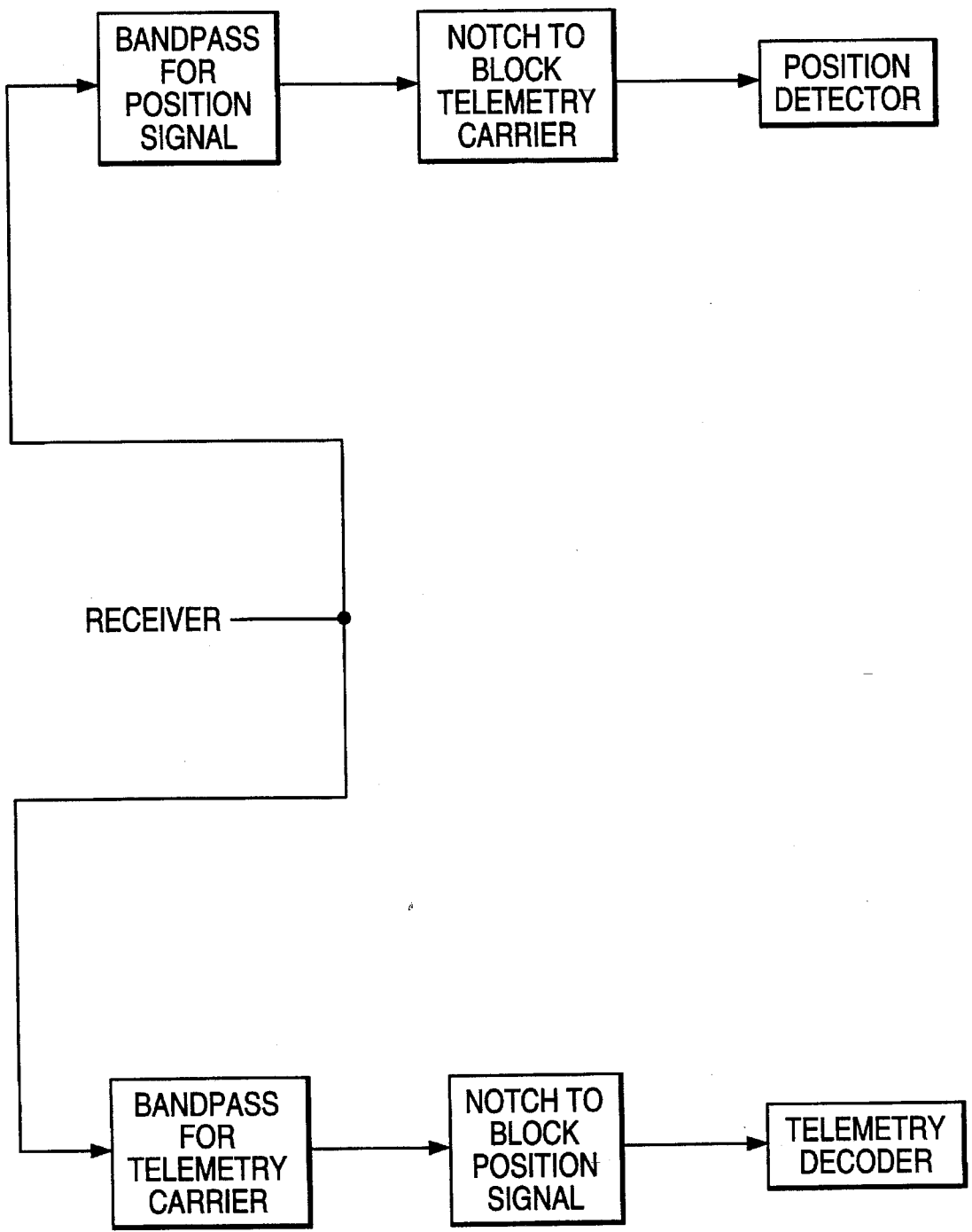
FIG. 12 illustrates another form of the invention.

For example, as shown in FIG. 12, in principle, one bandpass filter, centered at the position signal frequency, can pick off the position carrier, and block the telemetry signal. A second bandpass filter, centered at the telemetry carrier's frequency, can pick off the telemetry carrier and block the position signal.

A notch filter can be added to either or both for additional suppression of the signal to be blocked, as indicated.

It was stated that these filters can be used "in principle," because technical difficulties will inhibit their effectiveness. For example, the oscillator within the stylus will certainly drift in frequency. But the frequency characteristics of these filters will will remain the same. Thus, if drift occurs, these filters no longer provide ZEROes in FIG. 9A at the correct locations.

The invention provides the benefit of a filter having ZEROes which track the frequency of the oscillator, as discussed in the following section.

Figures 13A, 13B:
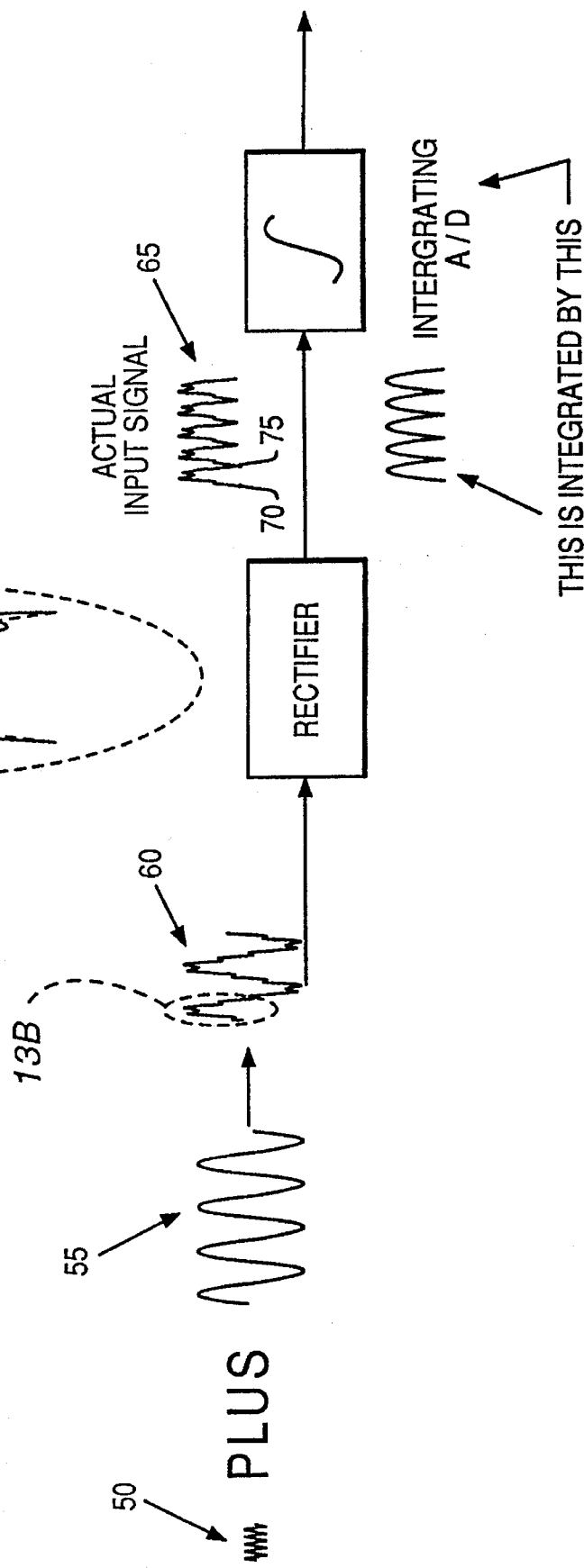
FIGS. 13A and 13B illustrate how a synchronous detector has the effect of producing the ZEROes shown in FIG. 9A.

6. The invention utilizes a synchronous coherent detector. One example is shown in FIG. 13A. This type of detector exploits the fact that a sine wave integrates to zero, when integrated over an integral number of periods. FIG. 14 illustrates this zero result.

Figure 14A:
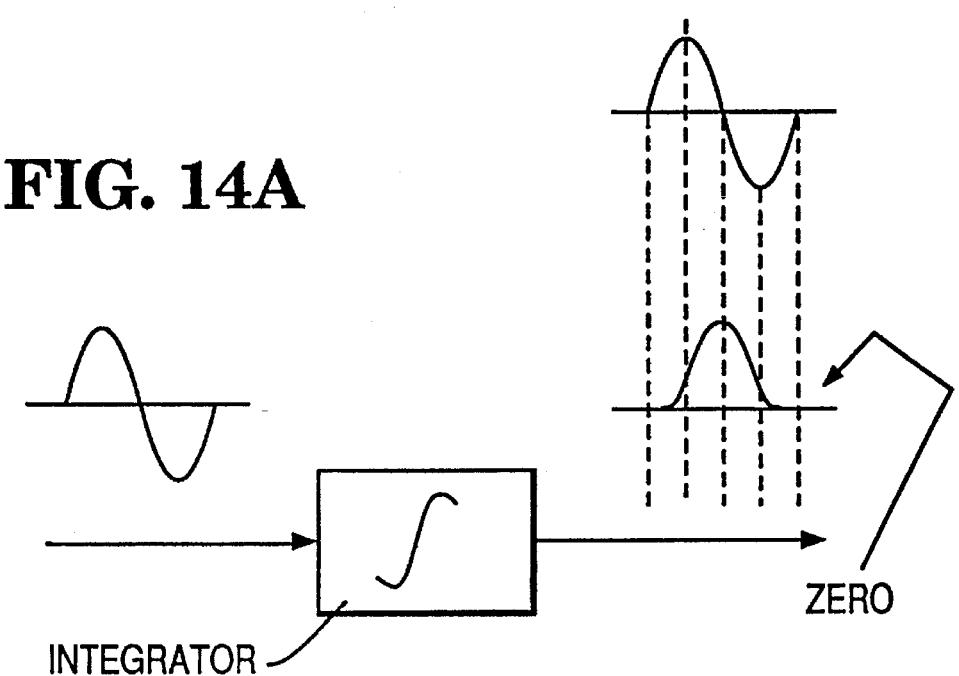
FIG. 14A illustrates how integration of a sine wave produces a zero result over one period, by comparison to a triangular wave, shown in FIG. 14B.
Figure 14B:
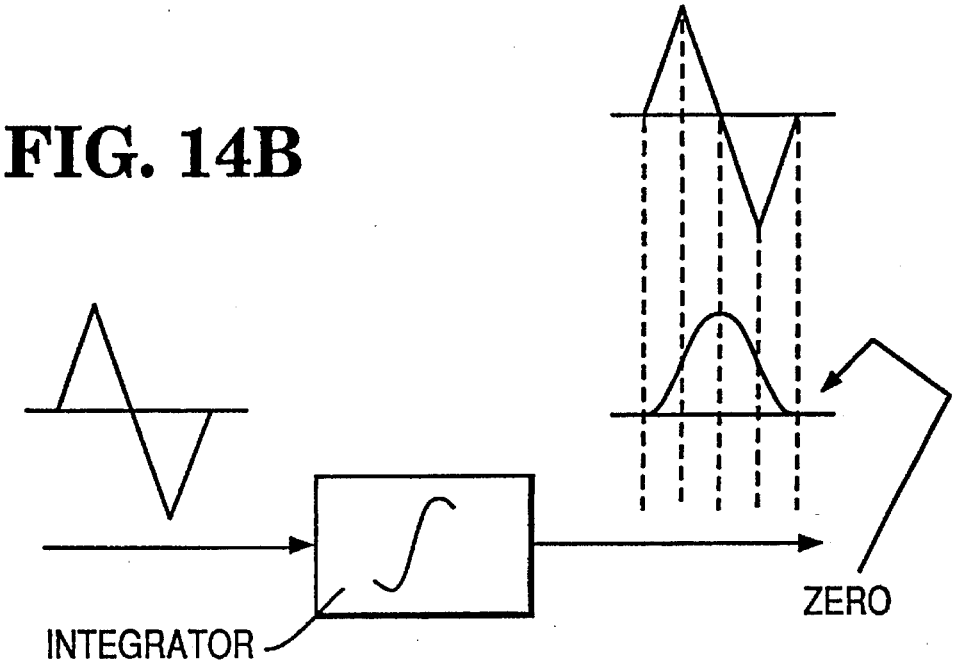

For simplicity, FIG. 14B illustrates a triangular wave. During integration, the area of the upper peak cancels the area of the lower peak. The sum is zero, as indicated.

Integration of the sine wave in FIG. 14A, although mathematically slightly more complicated, has the same property of integrating to zero over one period.

This property of integrating to zero still exists, even if the sine wave is superimposed on a carrier wave, as shown in FIG. 13. In that Figure, a high-frequency sine wave 50 (representing the telemetry signal) is added to a low-frequency sine wave 55 (representing the position signal). The resulting signal 60 is a modulated sine wave. This modulated sine wave is the composite signal broadcast by the stylus.

The invention rectifies the stylus signal 60, producing the rectified signal 65. The invention then integrates the rectified signal 65, in order to produce a standing voltage which can be converted to a digital word, by an analog-to-digital conversion, or A/D.

However, the integration is not done continuously, but periodically, and for time periods equal to the period of the position signal 55 (or as rectified into signal 65). That is, the INTEGRATING A/D is clocked at a rate equal to the frequency of the signal 55 (or signal 65). For example, as to signal 65, one integration cycle begins at point 70, and ends at point 75.

Because this clock rate is an integral multiple of the telemetry frequency (signal 50), and because the telemetry signal is not rectified, the telemetry signal integrates to zero over each integrating period. However, because the position signal has been rectified, and undergoes no negative swings, it does not integrate to zero, but to some positive voltage, which is processed by the A/D circuitry (not explicitly shown).

The clocking frequency is derived from the received signal 60. Phase-locked-loop (PLL) circuitry, known in the art, detects the incoming signal 60, and produces a pulse train of identical frequency. This pulse train is used to clock the INTEGRATING A/D.

A more complex mathematical analysis can be undertaken to show that the apparatus of FIG. 14 acts as the sinx/x filter whose transfer function is shown in FIG. 9A.

Figure 9C:
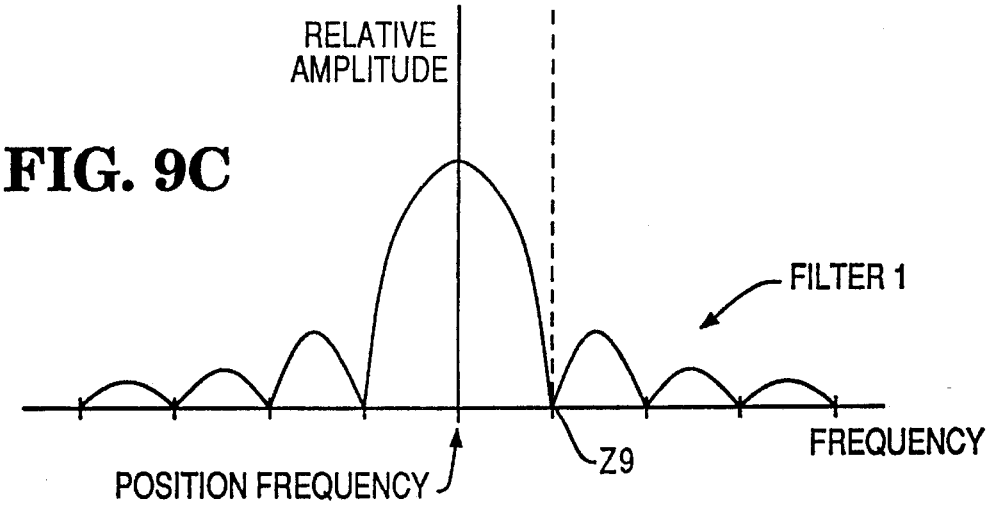
Figure 11A:
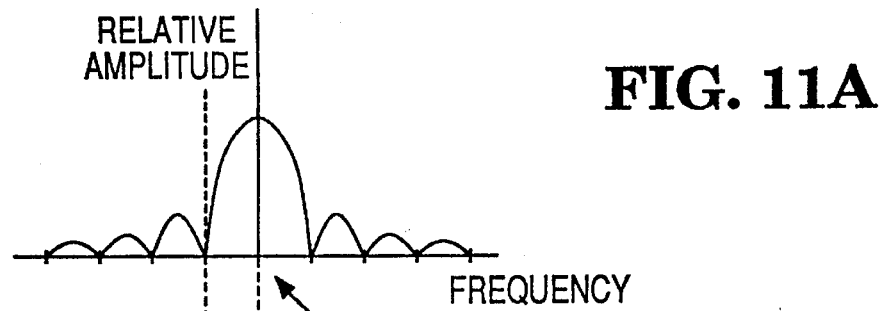
FIG. 11A, 11B, 11C and 11D illustrate how the bandwidth occupied by the sidebands in FIG. 10 is sufficiently small that FILTER 1 blocks these sidebands.
Figure 11B:
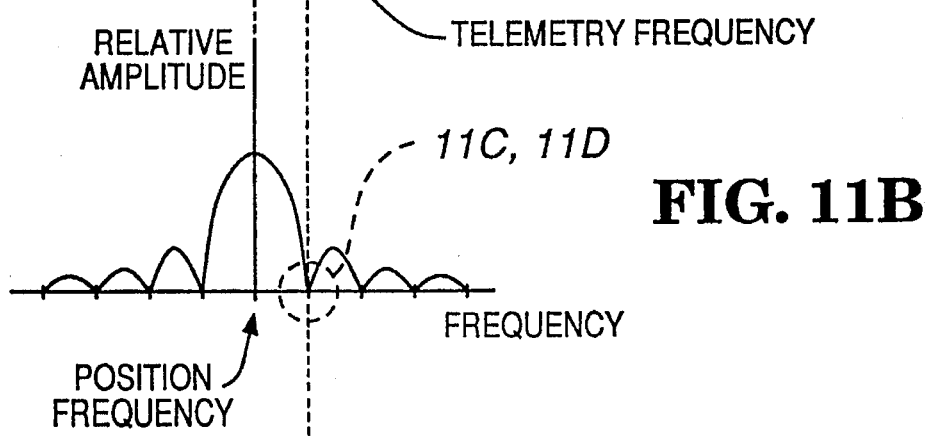
Figure 11C:
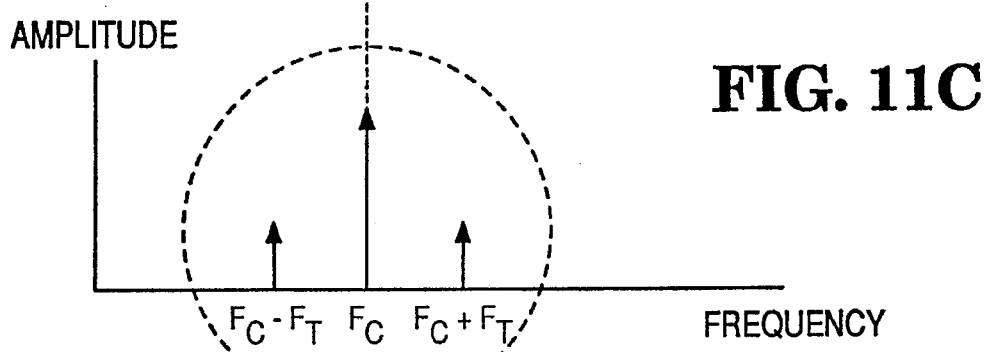
Figure 11D:
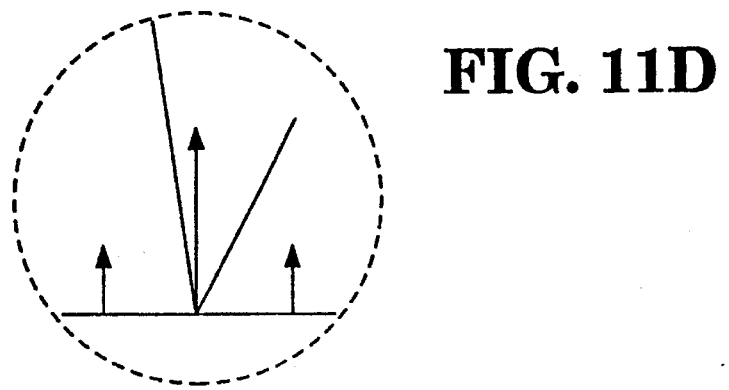

A major advantage of using this type of filter is that the PLL tracks the frequency of signal 60 (and thus of signal 55), and maintains the center of the transfer function at this frequency, which is the POSITION FREQUENCY shown in FIG. 9C, even if the POSITION FREQUENCY drifts.

This system, in FIG. 13A, suppresses the telemetry signal, and extracts the position signal. A second, similar, system suppresses the position signal and extracts the telemetry signal.

Figure 1:
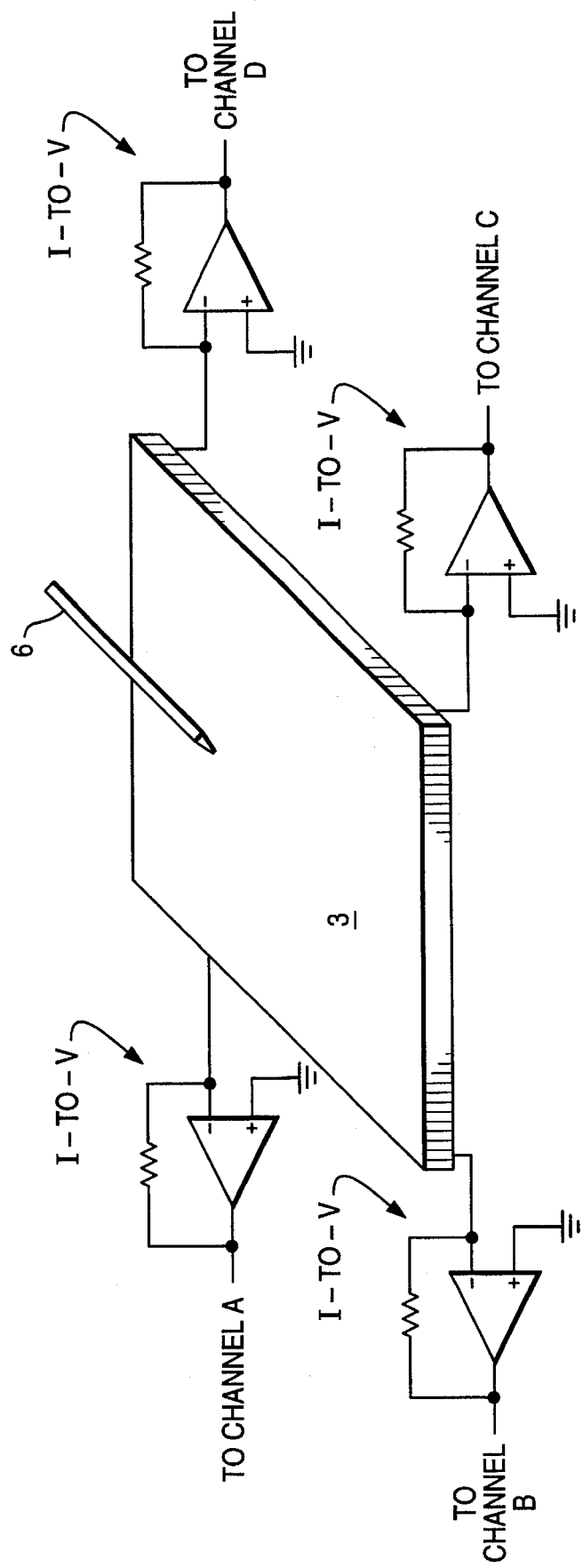
FIGS. 1 and 2 illustrate a digitizing tablet.
Figure 2:
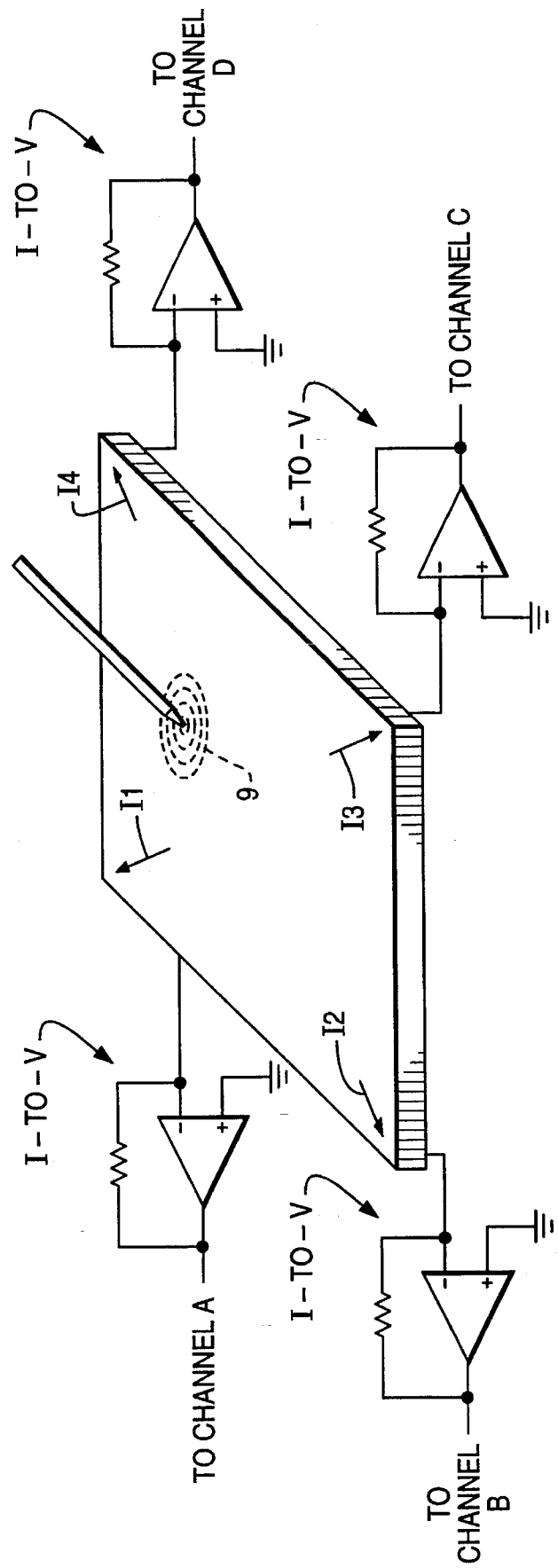
Figure 3:
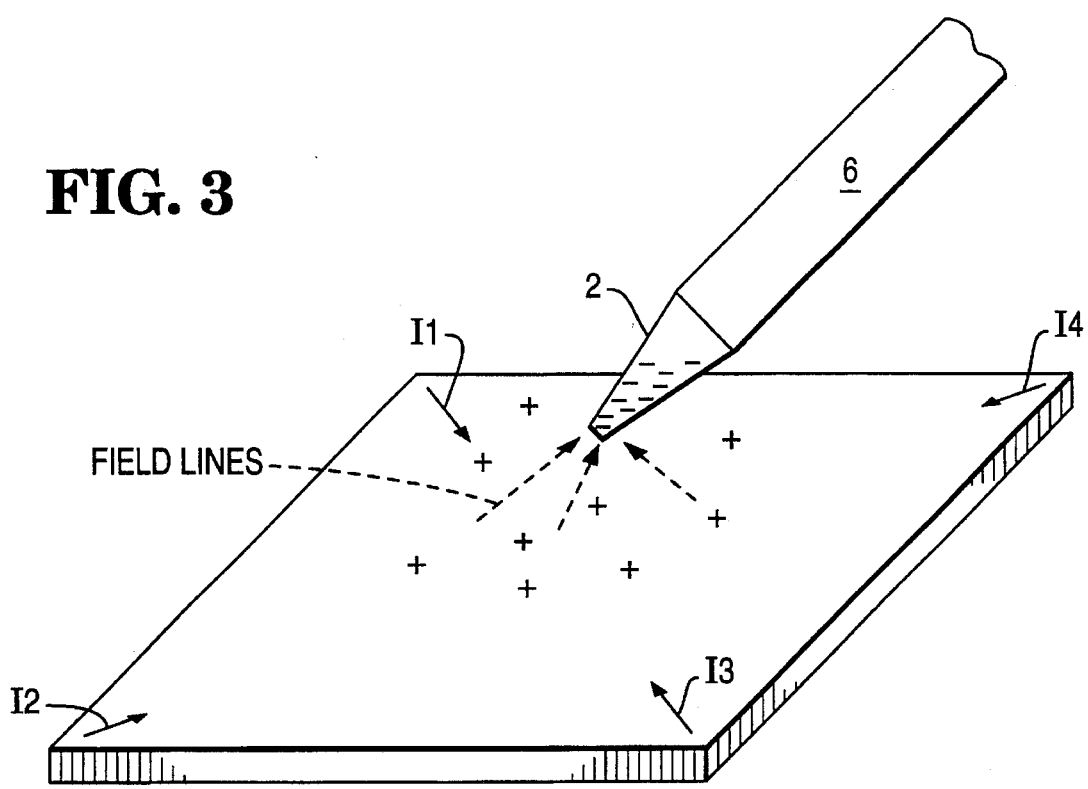
FIGS. 3 and 4 illustrate how the stylus 6 in FIGS. 1 and 2 induces currents in the digitizing tablet 3.
Figure 4:
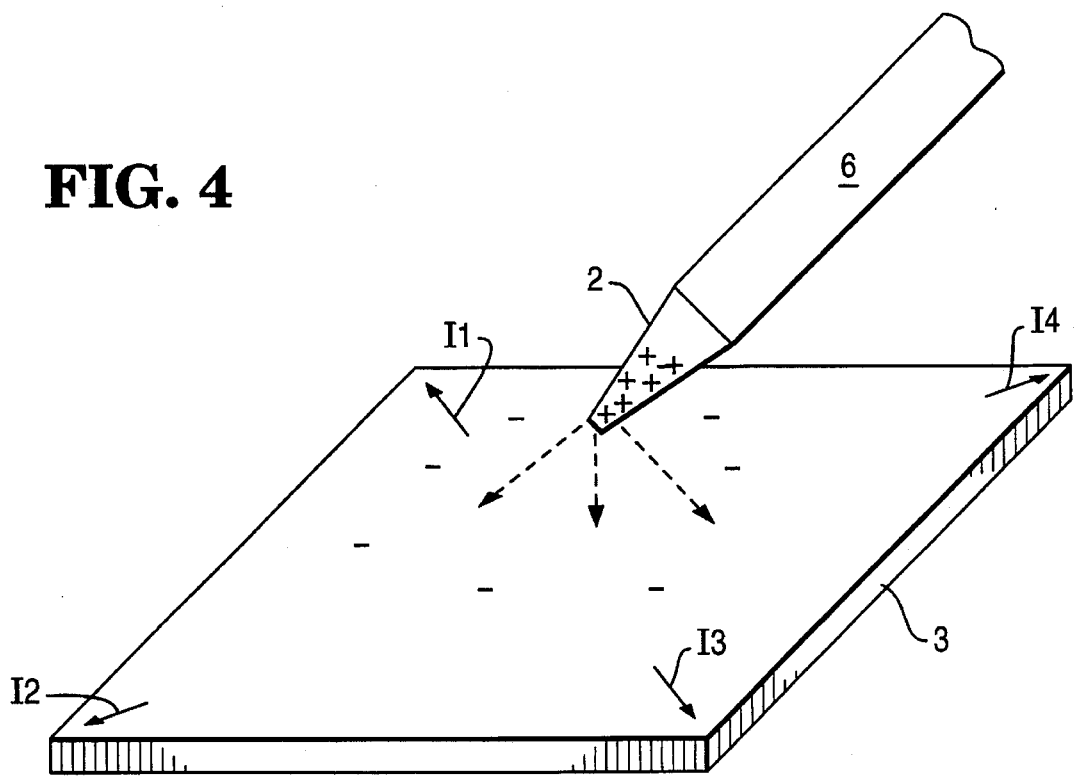
Figure 5:
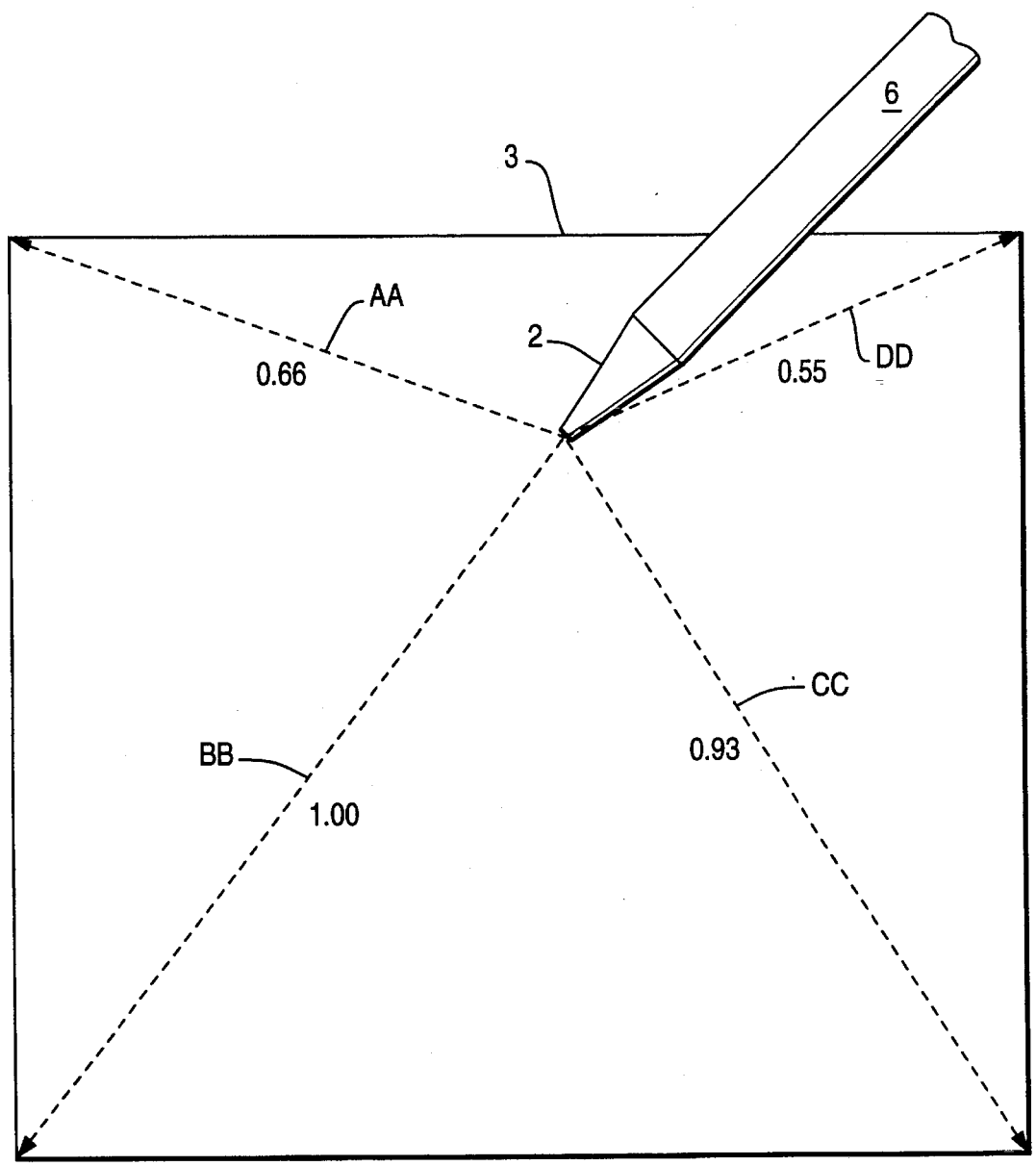
FIG. 5 illustrates highly simplified current paths on the digitizing tablet.
Figure 6:
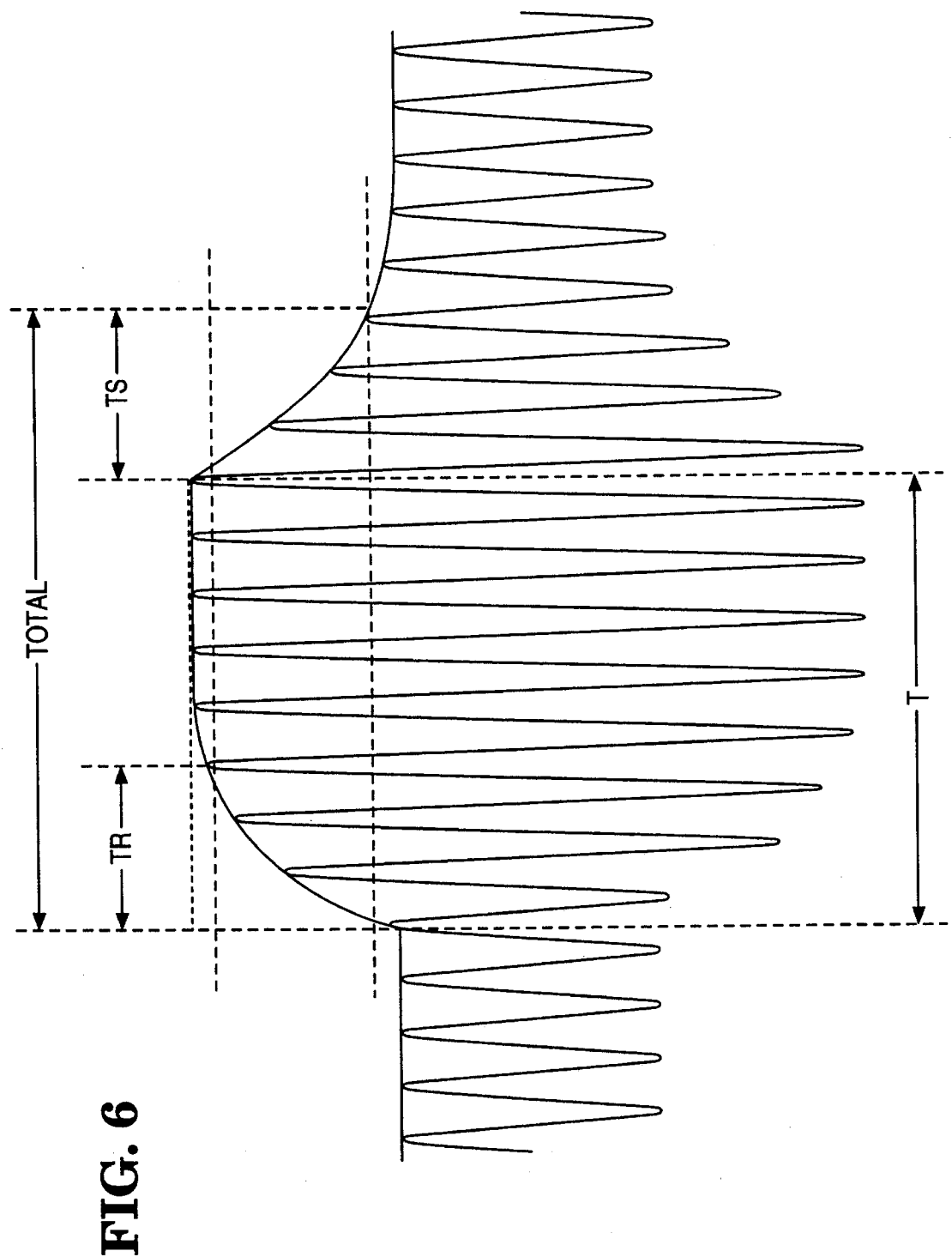
FIG. 6 illustrates a pulse-modulated carrier, and the settling time TS.

7. It should be emphasized that the position signal 9 in FIG. 2 is functionally different from the telemetry signal, at least in the following respect. When stylus position is being detected, the stylus transmits the same position signal, no matter where the stylus is located. Restated, at the very instant when the stylus signal leaves the stylus, there is no position information contained in it. Position information is derived from the currents induced by the signal, as discussed above.

In contrast, telemetry information is, in fact, contained in the telemetry signal at the instant when it leaves the stylus.

Thus, even though position information is derived from the position signal, the stylus is not transmitting position information.

8. Two oscillators have been discussed herein. However, it is recognized that two different frequencies can be obtained from a single oscillator by frequency multiplication and division techniques.

Numerous substitutions and modifications can be undertaken without departing from the true spirit and scope of the invention.

What is claimed is:

1. In a digitizing tablet which receives signals from a stylus, the improvement comprising:

a first filter having a passband centered at a first frequency f1, and zeroes at other frequencies, which filters a first received signal; and a second filter having a passband centered at a second frequency f2, which coincides with a zero of the first filter, which filters a second received signal.

2. In combination:

a stylus which transmits two signals at two different frequencies; and a receiver for one of the signals, comprising
a rectifier for rectifying the signal;
an integrator for periodically integrating the rectified signal; and
phase-locked-loop means for synchronizing the period of integration with one of the signals.

3. In combination:

a stylus which transmits two signals which may drift in frequency; and filter means for
tracking one of the signals,
maintaining a pass band centered on the tracked signal, and
maintaining a ZERO centered on the other signal.

\* \* \* \* \*